United States Patent [19]

Pabley

[11] 4,428,432

[45] Jan. 31, 1984

[54] METHOD FOR STIMULATING SILICEOUS SUBTERRANEAN FORMATIONS

[75] Inventor: Avtar S. Pabley, Littleton, Colo.

[73] Assignee: Smith International, Incorporated, Newport Beach, Calif.

[21] Appl. No.: 140,737

[22] Filed: Apr. 16, 1980

[51] Int. Cl.$^3$ .............................................. E21B 43/27
[52] U.S. Cl. ................................... 166/302; 166/307; 252/8.55 C
[58] Field of Search ..................... 252/8.55 R, 8.55 C; 166/307, 302

[56] References Cited

U.S. PATENT DOCUMENTS

| | | | |
|---|---|---|---|
| 2,094,479 | 9/1937 | Vandergrift | 252/8.55 |
| 3,301,723 | 1/1967 | Chrisp | 252/316 X |
| 3,888,312 | 6/1975 | Tiner et al. | 166/308 |
| 3,920,566 | 11/1975 | Richardson et al. | 252/8.55 |
| 3,923,666 | 12/1975 | Dill | 252/8.55 |
| 4,021,355 | 5/1977 | Holtmyer et al. | 252/8.55 |
| 4,033,415 | 7/1977 | Holtmyer et al. | 166/308 |
| 4,068,714 | 1/1978 | Hessert et al. | 166/307 X |
| 4,068,720 | 1/1978 | Hessert et al. | 166/282 |
| 4,313,834 | 2/1982 | Harris | 252/8.55 |

OTHER PUBLICATIONS

Sienko et al., *Chemistry: Principles and Properties*, Pub. by McGraw-Hill Book Co., New York.

*Primary Examiner*—Herbert B. Guynn

[57] ABSTRACT

Wells of subterranean siliceous formations containing hydrocarbons are stimulated by the injection of crosslinked acid polymers wherein the polymer is a polysaccharide selected from the group consisting of carboxymethyl hydroxypropyl guar and carboxymethyl hydroxyethyl cellulose. The crosslinked acid polymer is a gel formed from a hydrated polysaccharide sol containing from about 1 to about 15 weight percent hydrochloric acid and from about 0.2 to about 6 weight percent hydrofluoric acid to which a water hydrolyzable polyvalent metal salt is added to cause the crosslinking. The metal salt is zirconium, titanium or hafnium. Additionally, an adjunct salt can be added in an amount of from about 5 to about 50 pounds per 1,000 gallons acid prior to the addition of the hydrolyzable polyvalent metal salt.

The crosslinked acid polymer retards the chemical reactivity of the acid mixture of hydrochloric and hydrofluoric acid, thereby allowing the acid mixture to penetrate deeper into the formation before the activity of the acids are spent. After its injection, the crosslinked acid polymer breaks down as a result of time and temperature of the reservoir into a less viscous fluid allowing the acids to react with the formation.

15 Claims, No Drawings

METHOD FOR STIMULATING SILICEOUS SUBTERRANEAN FORMATIONS

DESCRIPTION

1. Technical Field

The process of the present invention relates to stimulating a siliceous subterranean formation containing hydrocarbons through the use of a crosslinked acid polymer in order to improve the recovery of hydrocarbons from the formation.

2. Background Art

Prior Art Statement

The use of a mixture of hydrochloric acid and hydrofluoric acid (mud acid) to stimulate subterranean siliceous formations containing hydrocarbons is well known. Mud acid has been combined with alcohol and/or surfactants or emulsified in order to increase the effectiveness of such a mixture in the stimulation of siliceous formations. However, the prior art has never retarded the activity of a hydrochloric/hydrofluoric acid mixture through the use of a crosslinked acid polymer.

U.S. Pat. No. 3,301,723 to Chrisp teaches the gelation of galactomannan gums for use in explosives by mixing water, galactomannan gum, a base and a crosslinking agent selected from the group of transition metals of atomic numbers 21 to 26, inclusive, 39 to 41, inclusive, 57, 72 and 73. Crosslinking done in the presence of titanium or zirconyl compounds are to be conducted at a pH less than 2; however, the patent teaches that the pH of the final product must be adjusted to 6 or higher.

U.S. Pat. No. 3,888,312 to Tiner, et al. teaches the fracturing of a subterranean formation with a crosslinked aqueous gel comprised of a polysaccharide having a molecular weight greater than 100,000, a crosslinking agent consisting of an organotitanate and an acid, such as hydrochloric acid, formic acid and fumaric acid, to adjust the pH to less than 7 in order to prevent swelling of clay present in the formation. There is no recognition of the ability to use crosslinked polysaccharides to acidize a subterranean formation. In fact, Tiner, et al. teach the use of sodium carboxymethyl cellulose and guar gum as preferred gelling agents. However, neither of these polysaccharides will form an acid crosslinked gel in the presence of a strong acid mixture of hydrochloric and hydrofluoric acid.

U.S. Pat. No. 4,021,355 and 4,033,415, both to Holtmyer, et al. teach the crosslinking of a hydratable polysaccharide with a crosslinking agent in an aqueous medium having a pH compatible with the crosslinking agent. Both of these patents are entirely devoid of any recognition of the fact that certain polysaccharides are capable of being crosslinked in the presence of high concentrations of strong acids, for example 1–21% by weight of a hydrochloric/hydrofluoric acid mixture, and that this allows for the preparation of a more effective acidizing solution for a siliceous subterranean formation. In fact, Holtmyer, et al. state that there is no need to add an acid when titanium tetrachloride is used and that when zirconyl chloride is used to crosslink polysaccharides, a basic pH is utilized. Furthermore, Holtmyer, et al. teach the crosslinking of carboxymethyl cellulose and guar gum, neither of which will form a crosslinked polymer in the presence of a mixture of hydrochloric and hydrofluoric acids.

It is generally known that polysaccharides are unstable in the presence of acids, especially strong acids. The prior art has neither recognized that there are certain polysaccharides which are sufficiently stable in the presence of a mixture of hydrochloric and hydrofluoric acid to allow them to form crosslinked acid gels nor that such gels are useful as acidizing agents for siliceous subterranean formations. These crosslinked acid gels retard the activity of the acid mixture when injected into a reservoir. This retardation in reactivity allows the mixture of acids to penetrate deeper into the formation prior to the acid activity being spent. Thereafter, the solution of the crosslinked acid polymer breaks down as a result of time and/or temperature of the reservoir to totally release the activity of the two acids and to allow for the live acids to react with the formation.

DISCLOSURE OF THE INVENTION

The present invention utilizes a crosslinked acid polymer to retard the chemical reactivity of a mixture of hydrochloric acid and hydrofluoric acid. The crosslinked acid polymer is injected into a siliceous formation for the purposes of stimulating the production of hydrocarbons from that formation. As a result of time and the temperature of the reservoir, the polymer solution breaks down, allowing live acid mixture to react with the siliceous materials and carbonates of the formation and allowing for the subsequent cleanup of the formation after the acidizing treatment. Although one use of this crosslinked acid polymer is for matrix-acidizing, the higher viscosity and shear stability of this crosslinked acid polymer are advantageous to fracture-acidizing operations because the crosslinked acid polymer produces wider and longer fractures in low permeability siliceous formations. The crosslinked acid polymer is also more effective in carrying propping agents into the formation. The system further provides excellent clay stabilization, emulsion prevention and insurance against acid corrosion, in addition to providing fluid loss control and low friction pressure losses.

For the purposes of this invention, the terms "crosslinked acid gel" and "crosslinked acid polymer" are used interchangeably. These terms relate to a product, which is a gel, formed by crosslinking a polysaccharide sol in an acid medium of hydrochloric acid and hydrofluoric acid. The polysaccharide acid sol is formed by the hydration of the polysaccharide in the presence of hydrochloric acid and hydrofluoric acid. The occurrence of the crosslinking is apparent by the transformation of the polysaccharide from a sol to a gel upon the addition of a water hydrolyzable polyvalent metal salt. It should be noted that the prior art often terms polysaccharide sols, whether or not they are acidic, as "gels". The term "gel" as applied to this invention refers to its chemical usage and not to a trade usage.

The term "per 1,000 gallons of acid" as used herein refers to the acid mixture as diluted in the product, i.e., it includes both the water and acids present in the crosslinked acid polymer. For the purposes of this invention, the term "acid" means a mixture of hydrochloric acid and hydrofluoric acid. The term "mud acid" as used herein refers to a mixture of hydrochloric acid (HCl) and hydrofluoric acid (HF).

The crosslinked acid polymer is comprised of a water soluble long chain chemically modified polysaccharide in an amount from about 30 to about 120 pounds per 1,000 gallons of acid (about 3.6 to about 14.4 kilograms per 1,000 liters), a water soluble polyvalent hydrolyzable metal salt capable of forming polynuclear ions in an amount from about 120 to about 1,680 pounds per 1,000 gallons of acid (about 14.4 to about 202 kilograms per 1,000 liters), hydrochloric acid present in an amount from 1 to about 15 percent by weight of the total crosslinked acid polymer and hydrofluoric acid present in an amount from about 0.2 to about 6 percent by weight of the total crosslinked acid polymer. Generally, an effective acid corrosion inhibitor is added in an amount from about 2 to about 6 gallons per 1,000 gallons of acid (about 2 to about 6 liters per 1,000 liters) so as to provide a crosslinked acid polymer system with effective corrosion inhibition. The concentration of the corrosion inhibitor is dependent upon the bottom-hole temperature and the contact time with pipes. Additionally, if desired, a suitable non-emulsifier in an amount from about 1 to about 5 gallons per 1,000 gallons of acid (about 1 to about 5 liters per 1,000 liters acid) can be added to the crosslinked acid polymer system.

Best Mode for Carrying Out the Invention

The crosslinked acid polymer of the present invention is useful in the stimulation of wells drilled into siliceous formations containing hydrocarbons, which formations do not exceed a temperature of 93° C. (200° F.). The crosslinked acid polymer may also be used in formations exceeding 93° C. (200° F.). However, to maintain sufficient stability of the crosslinked acid polymer to allow for its penetration into the formation, a preflush must be used to cool the formation to a temperature less than about 93° C. (200° F.) and preferably less than about 66° C. (150° F.) prior to the injection of the crosslinked acid polymer. The crosslinked acid polymer is useful for either matrix-acidizing or fracture-acidizing of the formation.

The terms "formation" and "siliceous formation" as used herein are intended to include siliceous geological formations containing sandstone, shale, feldspar, clay or other siliceous rock compositions and which contain less than about 20 percent carbonates. At carbonate concentrations exceeding about 20 percent, the hydrofluoric acid present in the crosslinked acid polymer will cause sufficient precipitation of calcium fluoride to interefere with the subsequent production from the formation.

The polymer which is crosslinked is a water soluble, long chain, high molecular weight polysaccharide. It is thought the crosslinking reaction of the hydrated polysaccharide with the polyvalent metal salt involves not only ionic bonding but also chelate formation between carboxyl groups as well as between adjacent hydroxyl groups and perhaps, initially at least, the formation of a coordinate bonding structure. Any hydrated polysaccharide which is sufficiently stable in an acid medium of hydrochloric and hydrofluoric acid to allow for its crosslinking may be used. Examples of suitable polysaccharides include carboxymethyl hydroxyethyl cellulose and carboxymethyl hydroxypropyl guar. A preferred polysaccharide is a carboxymethyl hydroxyethyl cellulose having a carboxymethyl degree of substitution of from 0.32 to 0.42 and a hydroxyethyl molecular substitution of from 2.0 to 2.5 and a more preferred polysaccharide is a carboxymethyl hydroxypropyl guar.

Generally the polymer will be used in an amount of from about 30 to about 120 pounds per 1,000 gallons of acid (about 3.6 to about 14.4 kilograms per 1,000 liters acid). An amount of from about 40 to about 80 pounds per 1,000 gallons of acid (about 4.8 to about 9.6 kilograms per 1,000 liters acid) is preferred. The amount of polymer used is dependent upon the concentration of the mud acid. Generally, as the concentration of the mud acid increases so must the concentration of the polymer increase. At mud acid concentrations of 12:3 and 15:5 (hydrochloric acid to hydrofluoric acid), it is preferred that at least about 80 pounds of polymer be used per 1,000 gallons of acid. The polymer may be used in an amount greater than 120 pounds per 1,000 gallons of acid; however, no additional benefit is gained by such high concentrations. As the amount of polymer increases so does the viscosity of the crosslinked acid polymer. Thus, the upper limit of the polymer is a function of viscosity; the crosslinked acid polymer cannot be so viscous that it cannot be pumped into the formation. Conversely, a polymer concentration of less than 30 pounds per 1,000 gallons acid can be used with some polysaccharides. Again, the crosslinked acid polymer solution must have sufficient viscosity to enable it to penetrate deeply into the formation and to carry propping agents, when the polymer solution is to be used in a fracturing manner.

The polymer must be hydrated prior to its contact with either concentrated hydrochloric or hydrofluoric acid and prior to its crosslinking. The polymer may be hydrated with water and then the acid and crosslinking agent are added to obtain the crosslinked acid polymer. Alternatively, the polymer is hydrated with diluted hydrochloric and hydrofluoric acid to obtain a polymer acid sol to which the crosslinking agent is added. The unhydrated polymer cannot be mixed directly with concentrated hydrochloric acid of approximately 37 weight percent or with concentrated hydrofluoric acid. The solution of hydrated polymer will be a low viscosity sol having a viscosity of less than about 100 centiposes at room temperature (as measured by a Fann V-G meter, model 35A at 300 r.p.m.). The polymer is mixed with a sufficient quantity of acid to obtain a final crosslinked acid polymer having an acid concentration of from about 1 to about 15 weight percent hydrochloric acid and from about 0.2 to about 6 weight percent hydrofluoric acid. It is preferred that the total acid (HCl:HF) concentration not exceed about 21 percent of the crosslinked acid polymer. For the treatment of most siliceous formations, the hydrochloric acid generally will be present in an amount of from about 3 to about 12 weight percent and the hydrofluoric acid generally will be present in an amount of from about 1.5 to about 3 weight percent. However, it must be realized that the particular composition of a mud acid used to stimulate a siliceous formation is dependent upon the particular formation being treated, e.g., the amount of damage to the formation, the presence and type of clay whether it be inherent in the formation or the result of drilling or workover activities, the physical rock structure and the temperature of the formation.

Generally, the lower the concentration of the acid, the more stable the resulting crosslinked polymer is. For example, at lower concentrations of acid of about 1.5 weight percent HCl and about 0.4 weight percent HF, the stability at room temperature is about 4 hours; at a concentration of about 3 weight percent HCl and about 0.75 weight percent HF, the stability is about 3 hours; at a concentration of about 6 weight percent HCl and about 1.5 weight percent HF, the stability is about 2 hours; at a concentration of about 12 weight percent HCl and about 3 weight percent HF, the stability at room temperature is about 1.5 hours; and at a concentration of about 15 weight percent HCl and about 5 weight percent HF, the stability at room temperature is about 1 hour. As the temperature of the crosslinked polymer solution increases due to the temperature of the reservoir, the stability decreases. Thus, a crosslinked acid polymer having stability of about 4 hours at room temperature has a stability of about 1–1.5 hours at 66° C. (150° F.).

To cause the crosslinking, a water hydrolyzable polyvalent metal salt is added. The metal ions of the salts must have a strong tendency to hydrolyze in very strong acid such that the metal ions retain their polynuclear nature. Thus, salts of hafnium, titanium and zirconium are used. Zirconium salts are preferred. The term "crosslinking agent" refers to these metal salts. Suitable salts of these metals include oxychloride, oxide, sulfate, tetrachloride and acetate. The oxychloride is the preferred salt of the metal.

The concentration of the crosslinking agent used is dependent upon the concentration of the polymer and the acid concentration. The expression "pounds of crosslinking agent per 1,000 gallons of acid" means that amount of a particular metal salt of titanium, hafnium and zirconium which is equivalent to the crosslinking activity of the expressed number of pounds of zirconium dioxide (zirconium dioxide is also known as zirconium oxide). For example, 150 pounds of crosslinking agent per 1,000 gallons acid means that amount of the crosslinking agent to be used which is equivalent in crosslinking activity to 150 pounds of zirconium dioxide per 1,000 gallons acid. Generally, the concentration of the crosslinking agent will increase as the concentration of the acid increases and more particularly, as the concentration of the hydrofluoric acid increases. The amount of the hydrolyzable polyvalent metal salt used in a particular crosslinked acid polymer will vary from about 120 to about 1,680 pounds per 1,000 gallons of acid (about 14.4 to about 202 kilograms per 1,000 liters acid). It is preferred that the salt be used in an amount from about 156 to about 1,440 pounds per 1,000 gallons of acid (about 18.7 to about 173 kilograms per 1,000 liters acid). The hydrolyzable polyvalent metal salt can be used either in a solid, e.g., powdered form, or in a liquid form. Due to the large amount of crosslinking agent which is required to obtain the crosslinked acid polymer, it is generally easier to use the crosslinking agent in a liquid form. Liquid preparations of crosslinking agents can be readily obtained, for example, several companies make a liquid preparation of zirconium oxychloride which contain varying percentages of zirconium oxide and hydrogen chloride. Therefore, the actual amount of a preparation of a particular crosslinking agent used will depend upon the concentration of the crosslinking agent contained in the preparation. A liquid preparation will be used in that amount which supplies a sufficient amount of the crosslinking agent to cause the needed crosslinking of the polymer.

The amount of crosslinking agent used is dependent on the acid concentration. For example, when the crosslinked acid polymer contains about 1.5 weight percent HCl and about 0.4 weight percent HF, at least about 144 pounds of zirconium dioxide per 1,000 gallons acid (about 17.3 kilograms per 1,000 liters acid) are used to obtain the crosslinking; at about 3 weight percent HCl and about 0.75 weight percent HF, at least about 240 pounds of zirconium dioxide per 1,000 gallons acid (about 28.8 kilograms per 1,000 liters acid) are used; at about 6 weight percent HCl and about 1.5 weight percent HF, at least about 408 pounds of zirconium dioxide per 1,000 gallons acid (about 48.9 kilograms per 1,000 liters acid) are used; at about 12 weight percent HCl and about 3 weight percent HF, at least about 780 pounds of zirconium dioxide per 1,000 gallons acid (about 93.6 kilograms per 1,000 liters acid) are used; and at about 15 weight percent HCl and about 5 weight percent HF, at least about 1,440 pounds of zirconium dioxide per 1,000 gallons acid (about 173 kilograms per 1,000 liters acid) are used.

The addition of another additive can be advantageous to the formulation of the crosslinked acid polymer. For the purposes of this invention the second salt is termed "adjunct additive". The use of an adjunct additive may reduce the tendency for solids to form upon the breaking of the crosslinked acid polymer. Suitable adjunct salts include ferric chloride, potassium dichromate, potassium iodide, sodium citrate, citric acid, sodium acetate, cobalt chloride, ammonium chloride, ethylene diaminetetraacetic acid, salicylic acid and equivalents of each of these. Potassium dichromate and ammonium chloride are the preferred adjunct additive and potassium dichromate is the most preferred. The adjunct additive is added in an amount of from about 5 to about 50 pounds per 1,000 gallons acid (0.6 to about 6.0 kilograms per 1,000 liters acid). It is preferred that the adjunct additive be added in an amount of from about 10 to about 30 pounds per 1,000 gallons acid (from about 1.2 to about 3.6 kilograms per 1,000 liters acid).

The ingredients and their amounts used in making the crosslinked acid polymer are selected to produce a product which is a pseudoplastic viscous fluid containing less than about 5 percent solids and having a stability of from about 1 to about 2 hours in the formation into which it is being injected, which is sufficient time to allow the acid to penetrate deeply into the formation. If necessary, the stability of the crosslinked acid polymer can be increased to decreased by varying the concentration of the polysaccharide, the mud acid, the crosslinking agent and, when used, the adjunct salt. The crosslinked acid polymer will generally have a viscosity of from about 90 to about 300 centiposes or more at room temperature (as measured by a Fann V-G model 35A at 300 r.p.m.). With time, the crosslinked acid polymer will break down into a viscous acidic fluid which reacts with the formation. As the acid is spent, the fluid becomes less viscous until the totally spent fluid has a viscosity of less than about 15 centiposes. Depending upon the polymer and the adjunct salt used, it is possible that some solids will remain in the spent acid. It is preferred that the solids, if present, constitute less than 5 percent of the spent acid solution.

The mixing order of the polymer, mud acid, crosslinking agent and, when used, adjunct additive, is generally not critical. However, the polymer must be hydrated prior to contact with concentrated hydrochloric or concentrated hydrofluoric acid and none of the ingredients can be added after the polymer is crosslinked. The polymer may be hydrated with water, then the mud acid and the adjunct salt added and lastly the crosslinking agent is added. Alternatively, the polymer is hydrated, the desired concentration of mud acid and adjunct additive are added to an aqueous solution of the crosslinking agent. Thereafter, the hydrated polymer is mixed with the aqueous acid solution of the crosslinking agent. The preferred order of mixing is to mix the mud acid with any supplemental additives, e.g., acid corrosion inhibitors and non-emulsifiers, and then the adjunct additive, if one is to be used, is added. Thereafter, the polymer is added and lastly the crosslinking agent is added. For ease of mixing, when the crosslinking agent is in a solid form, it is preferred that it be dissolved in water prior to its mixing with the other ingredients. It is also preferred that the acid corrosion inhibitor, previously mentioned, be added prior to the occurrence of crosslinking.

After the ingredients are mixed, they are allowed to stand for a few minutes to allow for the completion of the crosslinking processing. Under appropriate circumstances, it may be preferred that the acid crosslinked polymer be made in the field at the well site just prior to injection to the well. After formulation, the acid crosslinked polymer may be injected immediately down the well into the formation, as the required time for injection is sufficient to enable the crosslinking process to be completed.

The crosslinked acid polymer which is pumped into the well is initially a highly viscous solution and following injection becomes less viscous due to its pseudoplastic properties. In addition to matrix-acidizing, the viscous nature of the crosslinked acid polymer does make it suitable for fracture-acidizing of siliceous formations, when that type stimulation of the formation is desired.

In addition to thd acidizing properties of the crosslinked acid polymer, the polyvalent metal ions used to cause crosslinking have a strong tendency to hydrolyze and retain their polynuclear nature in the presence of a mud acid; thus, the crosslinked acid polymer also provides for a very effective clay stabilization resulting in greater formation permeability retention. Additionally, it provides fluid loss control, low friction pressure losses and has non-emulsifying properties.

Effective acid corrosion inhibitors are generally added to the crosslinked acid polymer in an amount of from about 2 to about 6 gallons per 1,000 gallons (about 2 to about 6 liters per 1,000 liters of acid). Examples of acid corrosion inhibitors include quaternary ammonium compounds, acetylenic alcohols, oxyalkylated phenols and mixtures thereof in aqueous alcohol solutions. Depending upon the formation, it may be desirable to add from about 1 to about 5 gallons of a non-emulsifier per 1,000 gallons (about 1 to about 5 liters per 1,000 liters of acid). Example of such non-emulsifiers include oxyalkylated alcohols, oxyalkylated polyamines, oxyalkylated phenols and mixtures thereof. Moreover, depending upon the bottom-hole temperature of the formation, it may be desirable to add a gel stabilizer. The stabilizer is desirable when the crosslinked acid polymer is to be used in a formation having a temperature more than 93° C. (200° F.) in order to extend the time for breakdown of the crosslinked acid polymer and the release of the live hydrochloric acid and hydrofluoric acid deeper into the formation. Diethylthiourea is an example of a suitable stabilizer. Other conventional additives to subterranean slugs can be added, if needed, such as ferric chloride and chelating agents, such as ethylenediaminetetraacetic acid and citric acid. When the crosslinked polymer is used to fracture-acidize a subterranean formation, then a proppant, such as sand, can be added in an amount of about 2 to 8 pounds per gallon of crosslinked acid polymer.

Depending upon the temperature of the formation, it may also be advantageous to preflush the well in order to cool the formation. Preflushes are useful when the temperature of the well is greater than about 66° C. (about 150° F.) and when the temperature is greater than about 93° C. (about 200° F.) a preflush must be used. The well is preflushed with a suitable cooling fluid, for example, water or water and an acid. The preflush is injected in a suitable volume sufficient to significantly decrease the temperature of the formation being treated and will vary depending upon the characteristics of the formation.

Depending upon the particular siliceous formation to be stimulated, it may also be advantageous to preflush the well with a hydrochloric acid solution. Such preflushes are well known in the art. A hydrochloric acid preflush acts to dissolve carbonate type materials present in the formation, thereby reducing the precipitation of calcium fluoride caused by the presence of hydrofluoric acid in the crosslinked acid polymer. The hydrochloric acid preflush may also serve as a cooling preflush.

EXAMPLE 1

Crosslinked acid polymers were prepared by mixing varying concentrations of diluted hydrochloric acid and diluted hydrofluoric acid with an adjunct additive. Then 80 pounds of carboxymethyl hydroxypropyl guar (a polysaccharide manufactured by the Celanese Polymer Specialities Company) per 1,000 gallons of acid were added to obtain a polysaccharide sol. Thereafter a crosslinking liquid preparation of zirconium oxychloride containing about 21.5% by weight zirconium oxide (a product of Harshaw Company) was blended into the polysaccharide sol. The mixture was then allowed to stand for a few minutes to complete the crosslinking process. The amount of hydrochloric acid (weight per volume total product) and the amount of the hydrofluoric acid (weight per volume total product) as well as the amount of adjunct salt (pounds per 1,000 gallons acid) and gallons of crosslinking agent per 1,000 gallons of acid are indicated in Table 1. The stability of most of the crosslinked acid polymers was measured at both room temperature (R.T.) and at an elevated temperature of 150° F. The stability is a measurement of the time required for the crosslinked acid polymer to break down.

TABLE 1

| Acid Conc. (HCl:HF) | Crosslinker (gals.) | Adjunct additive (lbs.) | Stability |
|---|---|---|---|
| 6:1.5 | 200 | KI (10) | — |
| 6:1.5 | 200 | $K_2Cr_2O_7$ (20) | R.T. = >60 min. 150° F. = 10–15 min. |
| 6:1.5 | 200 | Diethylthiourea (20) | R.T. = >8–10 hrs. 150° F. = 10–15 min. |
| 6:1.5 | 200 | Citric acid (20) | R.T. = >10 hrs. 150° F. = 10–15 min. |
| 6:1.5 | 200 | Cobalt chloride (20) | R.T. = >3 hrs. 150° F. = 10–15 min. |
| 15:5 | 725 | $K_2Cr_2O_7$ (10) | R.T. = 30–50 min. 150° F. = 15–30 min. |
| 15:5 | 700 | $K_2Cr_2O_7$ (20) | R.T. = 30–50 min. 150° F. = 15–30 min. |
| 15:5 | 650 | $K_2Cr_2O_7$ (50) | R.T. = 30–50 min. 150° F. = 15–30 min. |

EXAMPLE 2

Crosslinked acid polymers were prepared in the manner as described in Example 1. Each of the crosslinked acid polymers of this Example used 80 pounds of carboxymethyl hydroxyethyl cellulose (a product of the Hercules Company) per 1,000 gallons of acid. The amount of acid in weight per volume total product, the amount of the same type of liquid zirconium oxychloride as used in Example 1 in gallons per 1,000 gallons acid, and the amount of adjunct additive in pounds per 1,000 gallons acid are given in Table 2, as is the stability of the formed crosslinked acid polymers.

TABLE 2

| Acid Conc. (HCl:HF) | Crosslinker (gals.) | Adjunct additive (lbs.) | Stability |
|---|---|---|---|
| 6:1.5 | 150 | Citric acid (25) | — |
| 6:1.5 | 165 | Citric acid (25) | R.T. = >3 hrs. 150° F. = 20-25 min. |
| 3:0.75 | 90 | $NH_4Cl$ (50) | — |
| 3:0.75 | 110 | Citric acid (25) | R.T. = >24 hrs. 180° F. = 30-60 min. |
| 3:0.75 | 40 | $K_2Cr_2O_7$(5) $NH_4Cl$(25) | R.T. = >24 hrs. 180° F. = 15-50 min. |
| 3:0.75 | 50 | $K_2Cr_2O_7$(5) $NH_4Cl$(25) Diethylthiourea (10) | R.T. = >20 hrs. 180° F. = 50-60 min. |
| 3:0.75 | 100 | $K_2Cr_2O_7$(5) $NH_4Cl$(50) | R.T. = >20 hrs. 180° F. = 30-90 min. |
| 3:0.75 | 100 | $K_2Cr_2O_7$(5) $NH_4Cl$(25) | R.T. = >20 hrs. 180° F. = 30-90 min. |
| 3:0.75 | 105 | 0 | R.T. = >20 hrs. 150° F. = 10-40 min. |
| 3:0.75 | 100 | $K_2Cr_2O_7$(5) | R.T. = 18-20 hrs. 150° F. = 15-60 min. |
| 3:0.75 | 100 | $K_2Cr_2O_7$(10) | R.T. = 18-20 hrs. 150° F. = 15-60 min. |
| 3:0.75 | 100 | $K_2Cr_2O_7$(50) | R.T. = 18 hrs. 150° F. = 15-60 min. |

EXAMPLE 3

Crosslinked acid polymers were prepared by mixing varing concentrations of mud acid with carboxymethyl hydroxypropyl guar at varying concentrations to obtain a polysaccharide sol. To each polysaccharide sol was added the same type of liquid zirconium oxychloride as used in Example 1, as a crosslinking agent, and the mixture was blended and allowed to stand for a few minutes to complete the crosslinking process. The ratio of hydrochloric to hydrofluoric acid in weight per volume total product, the weight of polysaccharide in pounds per 1,000 gallons acid, and the amount of crosslinker in gallons per 1,000 gallons of acid are indicated in Table 3. The stability of several of the crosslinked acid polymer samples was measured and those measurements are also given in Table 3.

TABLE 3

| Acid Conc. (HCl:HF) | CMHPG (lbs.) | Crosslinker (gals.) | Stability |
|---|---|---|---|
| 12:3 | 40 | 400 | R.T. = 1-1.5 hrs. 150° F. = 20-30 min. |
| 6:1.5 | 80 | 180 | — |
| 15:5 | 80 | 840 | R.T. = 30-50 min. 150° F. = 15-30 min. |
| 6:1.5 | 40 | 200-210 | R.T. = 1.5-3.5 hrs. 150° F. = 20-40 min. |
| 12:3 | 60 | 450 | R.T. = 20-40 min. 150° F. = 10-40 min. |
| 12:3 | 40 | 450+ | R.T. = 1.5-2 hrs. 150° F. = 30-45 min. |
| 6:1.5 | 60 | 200 | R.T. = 1-3 hrs. 150° F. = 15-40 min. |
| 1.5:0.4 | 60 | 75 | — |
| 3:0.75 | 60 | 110 | R.T. = >48 min. 150° F. = 40-90 min. |

EXAMPLE 4

Crosslinked acid polymers utilizing 60 pounds of carboxymethyl hydroxyethyl cellulose per 1,000 gallons acid were prepared in the manner described in Example 1. The concentration of HCl and HF as weight percent of the total product, the amount of the same type of liquid zirconium oxychloride as used in Example 1 in gallons per 1,000 gallons of acid and the amount of adjunct salt in pounds per 1,000 gallons of acid (or gallons per 1,000 gallons acid) are given in Table 4, as is the stability of the crosslinked acid polymers for which such measurement was made.

TABLE 4

| Acid Conc. (HCl:HF) | Crosslinker (gals.) | Adjunct additive (lbs.) | Stability |
|---|---|---|---|
| 6:1.5 | 180 | Sodium acetate (15 gal.) | R.T. = >3-4 hrs. 150° F. = 35-40 min. |
| 6:1.5 | 225 | Citric acid(10) $NH_4Cl$(10) | R.T. = 3-4 hrs. 150° F. = 20-25 min. |
| 6:1.5 | 200 | Sodium acetate (40 gal.) | 150° F. = 25-30 min. |
| 6:1.5 | 165 | $K_2Cr_2O_7$(5) Sodium acetate (15 gal.) | 150° F. = 25-30 min. |
| 6:1.5 | 160 | EDTA(10) $K_2Cr_2O_7$(10) | 150° F. = 25-30 min. |
| 6:1.5 | 165 | Salicylic acid (20) $K_2Cr_2O_7$(20) | 150° F. = 20-25 min. |
| 6:1.5 | 165 | $K_2Cr_2O_7$(20) Cobalt chloride (10) | 150° F. = 20-30 min. |
| 6:1.5 | 170 | $FeCl_3$(20) $K_2Cr_2O_7$(10) | 150° F. = 20-30 min. |
| 6:1.5 | 165 | $FeCl_3$(20) Sodium acetate | 150° F. = 20-30 min. |
| 12:3 | 350 | 0 | — |
| 6:1.5 | 140 | $NH_4Cl$(50) | 150° F. = 20-25 min. |
| 6:1.5 | 165 | $NH_4Cl$(100) | — |
| 6:1.5 | 165 | NaCl(50) | — |
| 6:1.5 | 160 | $NH_4Cl$(50) $K_2Cr_2O_7$(10) | — |
| 6:1.5 | 185 | $NH_4Cl$(50) $FeCl_3$(20) | — |
| 6:1.5 | 160 | Citric acid(50) $NH_4Cl$(50) | — |
| 6:1.5 | 165 | $NH_4Cl$(50) Cobalt chloride (20) | — |
| 6:1.5 | 160 | $NH_4Cl$(50) $NaHSO_3$(20) | — |
| 6:1.5 | 165 | $NH_4Cl$(25) Sodium borate (10) | — |
| 3:0.75 | 100 | $FeCl_3$(20) $K_2Cr_2O_7$(10) | R.T. = 18 hrs. 150° F. = 20-60 min. |
| 3:0.75 | 100 | $FeCl_3$(20) Sodium acetate | R.T. = >24 hrs. 150° F. = 30-60 min. |
| 3:0.75 | 105 | Salicylic acid (20) $K_2Cr_2O_7$(20) | R.T. = 6-8 hrs. 150° F. = 15-60 min. |
| 3:0.75 | 100 | Acetic anhydride (5 gal. per 1,000 gal. acid), $K_2Cr_2O_7$(10) | R.T. = >6-8 hrs. 150° F. = 20-6 min. |

EXAMPLE 5

A crosslinked acid polymer was obtained by mixing hydrochloric acid and hydrofluoric acid with 50 pounds of ammonium chloride per 1,000 gallons acid. Then 100 pounds of carboxymethyl hydroxyethyl cellulose per 1,000 gallons acid were added to obtain a polysaccharide sol. Thereafter, 160 gallons of a liquid zirconium oxychloride preparation (containing about 21.5 weight percent zirconium oxide) per 1,000 gallons acid were blended into the polysaccharide sol. This resulted in a crosslinked acid polymer gel. The acids were added in an amount sufficient to obtain a final polymer gel product containing 6 weight percent hydrochloric acid and 1.5 weight percent hydrofluoric acid.

EXAMPLE 6

Crosslinked acid polymers using 60 pounds of carboxymethyl hydroxypropyl guar per 1,000 gallons acid were prepared in the manner described in Example 1. The ratio of hydrochloric to hydrofluoric acid in weight percent of the total product, the amount of adjunct salt in pounds per 1,000 gallons acid, and the amount of crosslinker in gallons per 1,000 gallons acid as well as the stability of the crosslinked polymers are given in Table 5.

TABLE 5

| Acid Conc. (HCl:HF) | Crosslinker (gals.) | Adjunct additive (lbs.) | Stability |
|---|---|---|---|
| 3:0.75 | 65 | $K_2Cr_2O_7$(10) | R.T. = >4 hrs.<br>150° F. = 40–90 min. |
| 6:1.5 | 200 | $K_2Cr_2O_7$(10) | R.T. = 1–2 hrs.<br>150° F. = 20–45 min. |
| 12:3 | 400 | $NH_4Cl$(50) | R.T. = >2 hrs.<br>150° F. = 15–30 min. |
| 6:1.5 | 165 | $NH_4Cl$(20) | R.T. = 3–4 hrs.<br>150° F. = 20 min.<br>1.5 hrs. |

EXAMPLE 7

Crosslinked acid polymers containing 40 pounds of carboxymethyl hydroxypropyl guar per 1,000 gallons acid were prepared in the manner described in Example 1. The amount of hydrochloric acid and hydrofluoric acid as weight percents of the total product, the amount of crosslinker in gallons per 1,000 gallons acid, the amount of adjunct additive in pounds per 1,000 gallons of acid and the stability of the crosslinked acid polymers are given in Table 6.

TABLE 6

| Acid conc. (HCl:HF) | Crosslinker (gals.) | Adjunct additive (lbs.) | Stability |
|---|---|---|---|
| 12:3 | 425 | $K_2Cr_2O_7$(2) | R.T. = >2–3 hrs.<br>150° F. = 15–30 min. |
| 6:1.5 | 200 | $NH_4Cl$(20) | 150° F. = 30–90 min. |
| 6:1.5 | 165 | $NH_4Cl$(20) | R.T. = >3–4 hrs.<br>150° F. = 20–90 min. |
| 6:1.5 | 165 | $NH_4Cl$(30) | 150° F. = 20–90 min. |

What is claimed is:

1. A process for the acidizing or acid-fracturing of a siliceous subterranean formation containing hydrocarbons comprising injecting into the subterranean formation a crosslinked acid polymer comprising:
   a polysaccharide selected from the group consisting of carboxymethyl hydroxypropyl guar and carboxymethyl hydroxyethyl cellulose wherein the polysaccharide is employed in an amount sufficient to gel the acid in the presence of a crosslinking agent;
   an acid mixture comprising from about 1 to about 15 weight percent of hydrochloric acid and from about 0.2 to about 6 weight percent of hydrofluoric acid; and
   a crosslinking agent which is a water soluble polyvalent metal salt wherein the metal is selected from the group consisting of zirconium and hafnium, wherein the crosslinking agent is present in an amount of between about 120 and about 1680 pounds per 1,000 gallons of acid.

2. The process of claim 1 wherein an adjunct additive selected from the group consisting of ferric chloride, potassium dichromate, potassium iodide, sodium citrate, citric acid, sodium acetate, cobalt chloride, ammonium chloride, ethylene diaminetetraacetic acid, salicylic acid is added prior to the addition of the crosslinking agent.

3. The process of claim 1 wherein the salt of the water soluble polyvalent metal salt is selected from the group consisting of oxychloride, oxide, sulfate, acetate and tetrachloride.

4. The process of claim 1 wherein the metal of the polyvalent metal salt is zirconium.

5. The process of claim 1 or claim 4 wherein the polysaccharide is a carboxymethyl hydroxyethyl cellulose having a carboxymethyl degree of substitution of from about 0.32 to about 0.42 and a hydroxyethyl substitution of from about 2.0 to about 2.5.

6. The process of claim 1 or claim 4 wherein the temperature of the formation does not exceed 93° C.

7. The process of claim 1 or claim 4 wherein the temperature of the formation exceeds 66° C. and wherein prior to the injection of the crosslinked acid polymer the formation is first cooled to a temperature less than about 66° C. by an injection of a preflush fluid.

8. The process of claim 4 wherein the crosslinked acid polymer is injected in a manner to stimulate the well by matrix-acidizing of the formation.

9. The process of claim 4 wherein the crosslinked acid polymer is injected in a manner to stimulate the well by fracture-acidizing of the formation.

10. The process of claim 9 wherein a proppant is added to the crosslinked acid polymer prior to injection.

11. The process of claim 2 or claim 4 wherein an acid-corrosion inhibitor is added to the crosslinked acid polymer prior to the polymer's injection into the formation.

12. The process of claim 1 wherein the polysaccharide is utilized in an amount of from about 40 to about 80 pounds per 1,000 gallons acid.

13. A crosslinked acid polysaccharide gel containing hydrochloric acid and hydrofluoric acid which comprises from about 40 to about 80 pounds polysaccharide per 1,000 gallons acid, wherein the polysaccharide is selected from the group consisting of carboxymethyl hydroxypropyl guar and carboxymethyl hydroxyethyl cellulose, from about 1 to about 15 weight percent hydrochloric acid, from about 0.2 to about 6 weight percent hydrofluoric acid and from about 156 to about 1,440 pounds of a water soluble polyvalent metal salt per 1,000 gallons acid, wherein the metal of the metal salt is selected from the group consisting of hafnium and zirconium.

14. The gel of claim 13 wherein it further comprises from about 5 to about 50 pounds of an adjunct additive for a thousand gallons acid which is added prior to the addition of the polyvalent metal salt and wherein the adjunct additive is selected from the group consisting of ammonium chloride and potassium dichromate.

15. The gel of claim 13 wherein the polysaccharide is a carboxylmethyl hydroxyethyl cellulose having a carboxymethyl degree of substitution of from about 0.32 to about 0.42 and a hydroxyethyl substitution of from about 2.0 to about 2.5.

* * * * *